United States Patent

Nakajima

[11] Patent Number: 5,993,964
[45] Date of Patent: Nov. 30, 1999

[54] FIBERS AND FIBROUS MOLDINGS USING THE SAME

[75] Inventor: Yuji Nakajima, Shiga, Japan

[73] Assignee: Chisso Corporation, Osaka, Japan

[21] Appl. No.: 09/064,191

[22] Filed: Apr. 22, 1998

[30] Foreign Application Priority Data

Apr. 22, 1997 [JP] Japan ..................................... 9-118895

[51] Int. Cl.$^6$ ................................ D02G 3/00; C08F 4/44; C08F 210/00
[52] U.S. Cl. .......................... 428/364; 428/395; 526/348; 526/125.3
[58] Field of Search ............................. 428/364; 526/348, 526/125.3; 525/240

[56] References Cited

U.S. PATENT DOCUMENTS

| | | | |
|---|---|---|---|
| 5,571,619 | 11/1996 | McAlpin et al. | 428/364 |
| 5,637,665 | 6/1997 | Sustic et al. | 526/348 |
| 5,637,666 | 6/1997 | Winter et al. | 526/351 |
| 5,668,235 | 9/1997 | Winter et al. | 526/351 |
| 5,714,554 | 2/1998 | Sustic et al. | 526/125.3 |
| 5,763,080 | 6/1998 | Stahl et al. | 428/364 |
| 5,874,505 | 2/1999 | Saito et al. | 525/240 |

FOREIGN PATENT DOCUMENTS

| | | |
|---|---|---|
| 0 600 461 | 6/1994 | European Pat. Off. . |
| 0 890 590 | 1/1999 | European Pat. Off. . |
| 62-156310 | 7/1987 | Japan . |
| 9-110934 | 4/1997 | Japan . |
| 95/32091 | 11/1995 | WIPO . |

OTHER PUBLICATIONS

Masahiro Kakugo et al. "C NMR Determination of Monomer Sequence Distribution in Ethylene–Propylene Copolymers Prepared Wth o–$\delta$TiCL$_3$–Al(C$_2$H$_5$)$_2$CL" Marcromolecules 1982, 15, 1150–1152.

Toshiyuki Tsutsui et al. "Propylene homo– and copolymerization with ethylene using an ethylenebis (1–indenyl) Zirconium dichloride and methylaluminoxane catalyst system" Polymer, 1989 vol. 30 Jul. 1350–1356.

*Primary Examiner*—Newton Edwards
*Attorney, Agent, or Firm*—McDermott, Will & Emery

[57] ABSTRACT

Fibers having an extremely high heat resistance, satisfactory strength and softness as well as good spinning stability are prepared from a propylene-ethylene copolymer having characteristic ethylene chains, an extremely low amount of reverse insertion of propylene monomer units, and a narrow molecular weight distribution.

10 Claims, No Drawings

FIBERS AND FIBROUS MOLDINGS USING THE SAME

FIELD OF THE INVENTION

This invention relates generally to fibers consisting of a specified propylene-ethylene copolymer in which propylene is a major component and which allows fibrous moldings to be formed from the same. More specifically, the present invention relates to fibers and fibrous moldings which find wide applicability in hygienic products such as sanitary napkins and throwaway or disposable diapers, filtering materials such as air filters and liquid filters, agricultural materials such as insect protecting nets, as well as concrete reinforcing materials.

DESCRIPTION OF THE RELATED ART

Polyolefin fibers mainly comprising propylene have hitherto found wide use in throwaway paper diapers etc., since they are lightweight, and exhibit good thermal insulation and softness properties. Further, fibers consisting of propylene-ethylene copolymers are heat-sealable at low temperatures and have been accordingly been used from an energy saving viewpoint.

Recently, non-woven fabrics having increased strength and soft physical properties such as are required in hygiene products such as the above mentioned disposable diapers etc., have been made of fibers consisting of propylene-ethylene copolymers inasmuch as they can be processed under controlled temperature conditions wherein the fibers are sufficiently softened during adhesive bonding in order to increase a strength. However, if non-woven fabrics are processed at high temperatures, the fabrics obtained are strong but they shrink markedly to form shrimps and also suffer a loss in softness. Conversely, if non-woven fabrics are processed near their melting points, that is, at the lowest possible temperature region for thermal adhesive processing, the non-woven fabrics lose strength because of insufficient adhesion, so that satisfactory products cannot be obtained.

Furthermore, in the case that non-woven fabrics or cylindrical filters processed from the non-woven fabrics are used under high temperature conditions, they suffer from the drawback that their durability is poor and that their form retaining and rigidity properties are reduced.

Thus, since the conventional fibers consisting of propylene-ethylene copolymers have the disadvantage of low heat resistance, which leads to processing and use at a high temperature is limited. Accordingly, improvements in properties is strongly desired in order to enlarge the scope of use of such materials.

Furthermore, since conventional fibers made of propylene-ethylene copolymers exhibit a fuming phenomenon owing to their low molecular weight, the oligomers contained in the polymers lead to a tendency for threads to break during spinning, thus limiting the fineness of the which can be used.

Published Japanese Patent document Toku-Kai-Sho 62-156310, discloses fibers consisting of ethylene-propylene random copolymers containing a specified amount of ethylene which exhibits superior heat roll processability. However, non-woven fabrics made these type of copolymers suffer from the disadvantage of poor softness, and accordingly, the temperature range for processing such material into non-woven fabric having sufficient strength and softness for practical use, is very narrow.

Thus, there is need to develop a fiber consisting of ethylene-propylene copolymer which satisfies all of the above strength and softness requirements.

SUMMARY OF THE INVENTION

In view of the above, it is an object of the invention to provide fibers consisting of a propylene-ethylene copolymer in which propylene is a major component.

It is a further object of the invention to provide fibrous moldings made from the above mentioned type of fibers wherein inherent light weight and softness are maintained in addition to thermal resistant characteristic is improved.

During development of the this invention, an in-depth study revealed that fibers having an extremely high heat resistance, satisfactory strength and softness as well as good spinning stability can be prepared from a propylene-ethylene copolymer having characteristic ethylene chains, an extremely low amount of reverse insertion of propylene monomer units, and a narrow molecular weight distribution.

More specifically, this invention features:

(1) fibers comprising propylene-ethylene copolymer consisting of 0.01 to 15 mol % of ethylene units and 99.99 to 85 mol % of propylene units as at least one raw material, wherein:
  a) a chain constitution of the copolymer found by means of nuclear magnetic resonance (NMR) spectrum has the following relationships:
    a-1) in three monomer chain units (triad) in main chains of the copolymer, there is a relationship:

$$0.0070 \times C2 - 0.0020 \leq PEP \leq 0.0070 \times C2 + 0.0130 \qquad (I)$$

between a fraction of three ethylene unit chain (EEE) and a total content of ethylene unit (C2), when PEP is positive, and
    a-2) in three monomer chain units (triad) in main chains of the copolymer, there is a relationship:

$$0 \leq EEE \leq 0.00033 \times C2 + 0.0010 \qquad (II)$$

between a fraction of three continuous ethylene unit chain (EEE) and a total content of ethylene unit (C2), as well as
    a-3) a ratio (Nαβ) of total α,β-methylene carbon atoms to total propylene units is within a range of 0 to 1.2 mol %,
  b) a weight average molecular weight (Mw) is 50,000 to 1,500,000, as well as
  c) a ratio (Mw/Mn) of a weight average molecular weight (Mw) to a number average molecular weight (Mn) is 1.2 to 3.8.

(2) Fibers according to item (1), wherein there is a relationship of formula (III)

$$-8.1 \times C2 + 156.0 \leq Tm \leq -4.4 \times C2 + 165.0 \qquad (III)$$

between a melting point of the copolymer (Tm) and a total content of ethylene units (C2).

(3) Fibers according to any of item (1) or (2), wherein fibers are composite fibers in which propylene-ethylene copolymer constitutes at least one component.

(4) A non-woven fabric, wherein fibers according to any of items (1) to (3) are used.

(5) A non-woven fabric according to item (4), wherein the non-woven fabric is a continuous fibrous non-woven fabric obtained using a spun-bonding method.

(6) A non-woven fabric according to item (4), wherein the non-woven fabric is a continuous fibrous non-woven fabric obtained by a melt-blowing method.

(7) A knitted textile, wherein fibers according to any of items (1) to (3) are used.

(8) A filter, wherein fibers according to any of items (1) to (3) are used.

(9) A filter, wherein a non-woven fabric according to any of items (4) to (6) is used.

(10) An absorbent article, wherein a non-woven fabric according to any of items (4) to (8) is partly used.

DETAILED DESCRIPTION OF THE PREFERRED EMBODIMENTS

The present invention will now be discussed in detail. The propylene-ethylene copolymer, which is used as a raw material in the fibers according to the present invention, is such that the total content of ethylene units (C2), chain unit fractions of monomers (PEP) and (EEE) as well as the number of total ($\alpha,\beta$-methylene carbon atoms, in the polymer chains, is calculated from data measured using a $^{13}$C-NMR spectra at 67.20 MHz and 130° C. in a mixed solution having 8/2 ratio by weight of o-dichlorobenzene/dueterated benzene bromide having a polymer concentration of 20% by weight. The device for measurement was, for example, JOEL-GX270 NMR (made by Nihon Denshi Co. Ltd.).

Propylene-ethylene copolymers used for the production of fibers according to the invention, are copolymers containing 0.01 to 15 mol %, preferably 0.05 to 12 mol %, and particularly preferably 0.05 to 10 mol % of ethylene units. If the total content of ethylene units is less than 0.01 mol %, characteristics inherent to the copolymers are lost, and if above 15 mol %, heat resistance is lowered due to decrease in crystallity of the copolymer.

Terms "fractional ratio of propylene unit→ethylene unit→propylene unit (PEP)" and "fractional ratio of three continuous ethylene units (EEE)" as to three-monomers chain units (triad) in main chains of propylene-ethylene copolymer are used in the present specification to mean that "fractional ratio of propylene unit→ethylene unit→propylene unit (PEP)" and "fractional ratio of three continuous ethylene units (EEE)" are bonded respectively to propylene and ethylene chains as triad units in the main chains of propylene-ethylene copolymer, as determined using a $^{13}$C-NMR spectrum method proposed by M. Kakugo et al. (Macromolecules 15, 1150 (1982)). In connection with the fibers according to the invention, the peak assignment of 13C-NMR spectra is determined based on the above-mentioned provision by Kakugo et al.

With respect to the propylene-ethylene copolymers used in the present invention, when considering the three continuous chain units (triad) of the monomer, in the total propylene and ethylene units in the main chains of the copolymer, a fractional ratio (PEP) of bonded propylene unit→ethylene unit→propylene unit, is present in a ratio of chain units of bonded propylene unit→ethylene unit→propylene units to all triad chain units. A higher triad fraction (PEP) shows a higher ratio of isolated ethylene units between propylene units, that is, a higher randomness.

As to propylene-ethylene copolymers used in the present invention, there is a relationship according to formula (I):

$$0.0070 \times C2 - 0.0020 \leq PEP \leq 0.0070 \times C2 + 0.0130 \qquad (I)$$

between a fractional ratio (PEP) of bonded propylene unit→ethylene unit→propylene unit and a total content of ethylene units (C2, unit: mol %) if PEP is positive, a preferable relationship is as follows:

$$0.0070 \times C2 \leq PEP \leq 0.0070 \times C2 + 0.011 \qquad (I')$$

and more preferably a relationship according to formula (I"):

$$0.0070 \times C2 \leq PEP \leq 0.0070 \times C2 + 0.0090 \qquad (I'').$$

A propylene-ethylene copolymer having a fraction ratio (PEP) of bonded propylene unit→ethylene unit→propylene unit in excess the above-mentioned formula (I) has not been found within the scope of the invention. On the other hand, if the (PEP) fractional ratio is below this, the adhesive property at low fiber temperatures is poor.

On the other hand, a fractional ratio (EEE) of three continuous ethylene units is a present ratio of chain units of bonded ethylene unit→ethylene unit→ethylene unit to all triad chain units in all of the propylene and ethylene units in main chains of the copolymer, in the case of considering three continuous chain units (triad) of monomer. The higher the triad fraction (EE) is, the higher the ratio of ethylene units present as blocks in the copolymer.

As to propylene-ethylene copolymers used in the present invention, there is a relationship of:

$$0 \leq EEE \leq 0.00033 \times C2 + 0.0010 \qquad (II)$$

between a fractional ratio (EEE) of bonded ethylene unit→ethylene unit→ethylene unit and a total content of ethylene units (C2, unit: mol %), preferably a relationship of formula (II'):

$$0.00033 \times C2 - 0.0028 \leq EEE \leq 0.00033 \times C2 + 0.0005 \qquad (II'),$$

and more preferably a relationship of formula (II"):

$$0.00033 \times C2 - 0.0022 \leq EEE \leq 0.00033 \times C2 \qquad (II'').$$

If the fractional ratio (EEE) of ethylene unit→ethylene unit→ethylene unit is in excess of the range of the above-mentioned formula (II), low temperature heat sealing properties of fibers made from the copolymer, becomes poor. On the other hand, if the (EEE) fractional ratio is below this, such copolymer has not been found within a technical range of the invention.

In this specification, a ratio (N$\alpha\beta$) of total $\alpha,\beta$-methylene carbon atoms to a total content of propylene unit (C3) is a present ratio (N$\alpha\beta$, unit: mol %) of total $\alpha,\beta$-methylene carbon atoms to a total content of propylene unit (C3) in main chains of propylene-ethylene copolymer determined by $^{13}$C-NMR spectra based on a method proposed by T. Tsutsui et al. (POLYMER, 30, 1350 (1989)), and it is 100 times of the numeric value defined as N$\alpha\beta$ in the literature. The value is based on spectra of $\alpha,\beta$-methylene carbon atoms owing to a 1,2-insertion reaction of propylene and an insertion reaction of ethylene occurred subsequently after a 2,1-insertion reaction, and reflects a reverse insertion amount of propylene monomer owing to 2,1-insertion reaction of propylene in the copolymer.

In propylene-ethylene copolymers used in the present invention, a ratio (N$\alpha\beta$) of total $\alpha,\beta$-methylene carbon atoms (unit: mol) to a total content of propylene unit (C3, unit: mol) is within a range of 0 to 1.2 mol %, preferably 0 to 0.5 mol %, and more preferably 0 to 0.2 mol %. If the ratio (N$\alpha\beta$) of total $\alpha,\beta$-methylene carbon atoms (unit: mol) to total content of propylene unit (C3, unit: mol) is too high, the heat resistance of the copolymer is lowered.

Propylene-ethylene copolymers used in the present invention have scarcely any reverse insertion of propylene monomer and have a chain structure of copolymer main chains in which ethylene units are bonded more randomly in the copolymer.

A weight average molecular weight (Mw) and a number average molecular weight (Mn) of propylene-ethylene copolymer used in the present invention are based on results determined by using a 0.05% by weight solution of o-dichlorobenzene and a mixed polystyrene gel column (for example, PSKgel GMH6-HT made by Toso Co. Ltd.) as a column by gel permeation chromatography (GPC) at 135° C. As a determining device, for example, GPC-150C (made by Water Co. Ltd.) can be used.

Propylene-ethylene copolymer used in the present invention has a weight average molecular weight (Mw) of within a range of 50,000 to 1,500,000, preferably 100,000 to 1,000,000.

If the weight average molecular weight (Mw) is too high, a melt flow property of the copolymer is decreased and lowers the stretching property of thread into fiber, and if it is too low, the strength of fiber is lowered.

A ratio (Mw/Mn) of a weight average molecular weight (Mw) to a number average molecular weight (Mn) is 1.2 to 3.8, preferably 1.5 to 3.5.

The ratio (Mw/Mn) of a weight average molecular weight (Mw) to a number average molecular weight (Mn) is a scale of molecular weight distribution. If the ratio (Mw/Mn) is too high, a molecular weight distribution becomes too wide and an adhesivity of fibers obtained by spinning the copolymer becomes poor. On the other hand, propylene-ethylene copolymer having a ratio (Mw/Mn) of less than 1.2 has not found within the technology of the present invention.

Propylene-ethylene copolymer used in the present invention has a relationship according to formula (III)

$$-8.1 \times C2 + 156.0 \leq Tm \leq -4.4 \times C2 + 165.0 \quad (III)$$

between a melting point of the copolymer (Tm) and a total content of ethylene units (C2, unit: mol %) owing to having these constitutional characteristics, and a relationship according to formula (III')

$$-7.2 \times C2 + 156.0 \leq Tm \leq -4.9 \times C2 + 165.0 \quad (III')$$

as the case may be according to constitutional conditions, and furthermore a relationship according to formula (III")

$$-6.3 \times C2 + 156.0 \leq Tm \leq -5.4 \times C2 + 165.0 \quad (III'').$$

A melting point is a value of peak temperature showing maximal endothermal amount during melting after increasing a temperature of propylene-ethylene copolymer from the room temperature to 230° C. under a temperature increasing condition of 30° C./minute, maintaining the temperature for 10 minutes, decreasing to −20° C. at −20° C./minute, maintaining the temperature for 10 minutes and melting under a temperature increasing condition of 20° C./minute.

As to preparation method of propylene-ethylene copolymer used in the present invention, there is no particular limitation if the obtained propylene-ethylene copolymer satisfying the above-mentioned conditions, but a preparation method using a specified metallocene catalyst is preferable, wherein a chiral transitional metallic compound as a specific metallocene and aluminoxane are used in combination as a catalyst.

Usable metallocenes are chiral transitional metallic compounds expressed by the general formula (1)

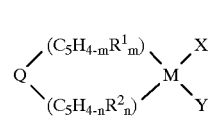

(1)

wherein, M is a transitional metallic atom selected from the group consisting of titanium, zirconium and hafnium; X and Y are same or different hydrogen atoms, halogen atoms or hydrocarbon groups; $(C_5H_{4-m}R^1_m)$ and $(C_5H_{4-n}R^2_n)$ are substituted cyclopentadienyl groups wherein $R^1$ and $R^2$ are the same or different hydrocarbon group with 1 to 20 carbon atom(s) optionally bonded with two carbon atoms on cyclopentadienyl ring to form one or more hydrocarbon ring(s) or optionally substituted further with (a) hydrocarbon group(s), or silicon-containing hydrocarbon groups, m and n is an integer of 1 to 3; Q is a two-valent group selected from the group consisting of hydrocarbon group, non-substituted silylene group and hydrocarbon-substituted silylene group which can crosslink $(C_5H_{4-m}R^1_m)$ and $(C_5H_{4-n}R^2_n)$.

Chiral transitional metallic compounds of the general formula (1) wherein M is zirconium or hafnium atom, $R^1$ and $R^2$ are same or different alkyl groups with 1 to 20 carbon atom(s), X and Y are same or different halogen atoms or hydrocarbon atoms, and Q is dialkyl silylene group are preferable.

As concrete examples of the chiral transitional metallic compounds expressed by the general formula (1), the followings are mentioned: rac-dimethyl silylene bis(2-methyl-4,5,6,7-tetrahydroindenyl)zirconium dichloride, rac-dimethyl silylene bis(2-methyl-4,5,6,7-tetrahydroindenyl) zirconium dimethyl, rac-ethylene bis(2-methyl-4,5,6,7-tetrahydroindenyl)hafnium dichloride, rac-dimethyl silylene bis(2-methyl-4-phenylindenyl) zirconium dichloride, rac-dimethyl silylene bis(2-methyl-4-phenylindenyl)zirconium dimethyl, rac-dimethyl silylene bis(2-methyl-4-phenylindenyl)hafnium dichloride, rac-dimethyl silylene bis (2-methyl-4-naphthylindenyl)zirconium dichloride, rac-dimethyl silylene bis(2-methyl-4-naphthylindenyl) zirconium dimethyl, rac-dimethyl silylene bis(2-methyl-4-naphthylindenyl) hafnium dichloride, dimethyl silylene(2,4-dimethyl cyclopentadienyl)(3',5'-dimethyl cyclopentadienyl)titanium dichloride, dimethyl silylene(2,4-dimethyl cyclopentadienyl)(3',5'-dimethyl cyclopentadienyl)zirconium dimethyl, dimethyl silylene(2, 4-dimethyl cyclopentadienyl)

(3',5'-dimethyl cyclopentadienyl)zirconium dimethyl, dimethyl silylene(2,4-dimethyl cyclopentadienyl)(3',5'-dimethyl cyclopentadienyl)hafnium dichloride, dimethyl silylene(2,4-dimethyl cyclopentadienyl)(3',5'-dimethyl cyclopentadienyl)

hafnium dimethyl, dimethyl silylene(2,3,5-trimethyl cyclopentadienyl)(2',4',5'-trimethyl cyclopentadienyl) titanium dichloride, dimethyl silylene(2,3,5-trimethyl cyclopentadienyl)

(2',4',5'-trimethyl cyclopentadienyl)zirconium dichloride, dimethyl silylene(2,3,5-trimethyl cyclopentadienyl)(2', 4',5'-trimethyl cyclopentadienyl)zirconium dimethyl, dimethyl silylene(2,3,5-trimethyl cyclopentadienyl)(2', 4',5'-trimethyl cyclopentadienyl)hafnium dichloride and dimethyl silylene(2,3,5-trimethyl cyclopentadienyl)(2',4',5'-trimethyl cyclopentadienyl) hafnium dimethyl.

Amongst these transitional metallic compounds, the followings are particularly preferable: dimethyl silylene(2,4-dimethyl cyclopentadienyl)(3',5'-dimethyl cyclopentadienyl) zirconium dichloride, dimethyl silylene (2,4-dimethyl cyclopentadienyl)(3',5'-dimethyl cyclopentadienyl)zirconium dimethyl, dimethyl silylene(2,4-dimethyl cyclopentadienyl) (3',5'-dimethyl cyclopentadienyl)hafnium dichloride, dimethyl silylene(2,4-dimethyl cyclopentadienyl)(3',5'-dimethyl cyclopentadienyl)hafnium dimethyl, dimethyl silylene(2,3,5-trimethyl cyclopentadienyl)(2',4',5'-trimethyl cyclopentadienyl)zirconium dichloride, dimethyl silylene(2,3,5-trimethyl cyclopentadienyl)(2',4',5'-trimethyl cyclopentadienyl)zirconium dimethyl, dimethyl silylene(2,3,5-trimethyl cyclopentadienyl)(2',4',5'-trimethyl cyclopentadienyl)hafnium dichloride and dimethyl silylene (2,3,5-trimethyl cyclopentadienyl)(2',4',5'-trimethyl cyclopentadienyl)hafnium dimethyl.

During synthesis of these chiral metallocenes, non-chiral constitutions, i.e. meso metallocene compounds, may be produced together, but not all are necessary to be chiral metallocenes in practical use so that meso compounds may be mixed in. However, when a mixture with a meso compound is used, an atactic polymer from a meso compound may be removed by any known method such as solvent extraction etc., to satisfy the conditions of the invention as to the obtained propylene-ethylene copolymer, according to a mixed amount of the meso compound and a copolymerization activity of propylene-ethylene copolymer, as the case may be.

These chiral metallocenes may be used as such to make a catalyst in combination with aluminoxane, or used in supported form on a particulate carrier. As these particulate carriers, granular or spherical particulate solids of inorganic or organic compounds having a particulate diameter of 5 to 300 μm, preferably 10 to 200 μm, are used.

As the inorganic compounds used as carriers, there may be mentioned $SiO_2$, $Al_2O_3$, MgO, $TiO_2$ and ZnO etc. as well as these mixtures or composite compounds, for example, $SiO_2$—$Al_2O_3$, $SiO_2$—MgO, $SiO_2$—$TiO_2$, $SiO_2$—$Al_2O_3$—MgO etc. Amongst of them, those having a main component of $SiO_2$ or $Al_2O_3$ are preferable.

Furthermore, as the organic compounds used as carriers, polymers or copolymers of α-olefins such as ethylene, propylene, 1-butene, 4-methyl-1-pentene etc., styrene polymers or copolymers are mentioned.

Aluminoxanes combined as a catalytic component with chiral transitional compounds in a preparation method of propylene-ethylene copolymer used in fibers of the invention are organic aluminum compounds expressed by the general formula (2) or (3).

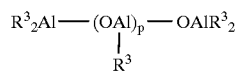

(2)

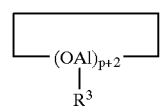

(3)

Wherein, $R^3$ is a hydrocarbon group with 1 to 6, preferably 1 to 4, carbon atoms, for example, an alkyl group such as methyl group, ethyl group, propyl group, butyl group, isobutyl group, pentyl group and hexyl group etc., an alkenyl group such as allyl group, 2-methylallyl group, propenyl group, isopropenyl group, 2-methyl-1-propenyl group and butenyl group etc., a cycloalkyl group such as cyclopropyl group, cyclobutyl group, cyclopentyl group and cyclohexyl group etc., as well as an aryl group. Amongst these, an alkyl group is particularly preferable, and each $R^3$ may be same or different and p is an integer of 4 to 30, preferably 6 to 30, and particularly preferably 8 to 30.

These aluminoxanes may be used alone or in combination with two or more others. Furthermore, they may be used with alkyl aluminum compounds such as trimethyl aluminum, triethyl aluminium, triisopropyl aluminium, triisobutyl aluminium and dimethyl aluminium chlorides etc.

Aluminoxanes can be prepared under various known conditions. More specifically, the following methods may be exemplified.

(1) A method of reacting trialkyl aluminium directly with water using an organic solvent such as toluene and ether etc.

(2) A method of reacting trialkyl aluminium with salts containing water of crystallization such as hydrated copper sulfate hydrate and hydrated aluminium sulfate.

(3) A method of reacting trialkyl aluminium with water impregnated in silica gel etc.

(4) A method of mixing trimethyl aluminium with triisobutyl aluminium and react them directly with water using an organic solvent such as toluene and ether etc.

(5) A method of mixing trimethyl aluminium with triisobutyl aluminium and reacting them with salts containing water of crystallization such as hydrated copper sulfate hydrate and hydrated aluminium sulfate.

(6) A method of impregnating water in silica gel etc., and reacting it with triisobutyl aluminium and then trimethyl aluminium.

When the above-mentioned metallocenes and aluminoxanes are used in combination as a catalyst in a preparation method of propylene-ethylene copolymer used in fibers according to the invention, respective used amounts of catalyst components are such that aluminium atoms in aluminoxanes is within a range of 10 to 100,000 moles per 1 mole of a transitional metallic atom in metallocene, preferably 50 to 50,000 moles, and particularly preferably 100 to 30,000 moles.

Propylene-ethylene copolymer used in the present invention can be prepared by copolymerizing propylene and ethylene in the presence of a catalyst consisting of the above-mentioned combination, and any known (co)polymerization process of propylene may be used as a polymerization method such as a slurry copolymerization method in which propylene and ethylene is polymerized in an inactive solvent, for example, aliphatic hydrocarbons such as butane, pentane, hexane, heptane and isooctane etc., alicyclic hydrocarbons such as cyclopentane, cyclohexane and methylcyclohexane etc., aromatic hydrocarbons such as toluene, xylene and ethyl benzene etc. as well as gasoline fractions and hydrogenated diesel oil fractions; a bulk copolymerization method in which propylene itself is used as a solvent; and a vapor phase copolymerization method in which copolymerization of propylene and ethylene is carried out in vapor phase.

Furthermore, copolymerization can be carried out in any mode of continuous, batchwise or semi-batchwise ones.

For copolymerization of propylene and ethylene, the above-mentioned catalyst may be supplied to a copolymerization reaction system after mixing metallocene and aluminoxane previously in an inorganic solvent, or metallocene and aluminoxane may be supplied separately to a copolymerization reaction system. Furthermore, before the main copolymerization of propylene and ethylene, a minor amount of α-olefin, more specifically, about 0.001 to 10 kg of α-olefin per 1 mole of transitial metal in metallocene, may be polymerized in an organic solvent to pre-activate a catalyst consisting of combined metallocene and aluminoxane, whereafter the main copolymerization of propylene and ethylene may be carried out. This process is effective for obtaining final propylene-ethylene copolymer in a good particulate form.

As α-olefins useful for pre-activation, α-olefins with 2 to 12 carbon atoms, specifically ethylene, propylene, butene, pentene, hexene, octene and 4-methyl-1-pentene etc. are mentioned, and particularly ethylene, propylene and 4-methyl-1-pentene are used preferably.

When propylene-ethylene copolymers used in fibers according to the invention are obtained by copolymerizing propylene and ethylene in the presence of the above-mentioned catalyst or the pre-activated catalyst by the above-mentioned polymerization processes, the copolymerization conditions used are similar to those for propylene polymerization by means of generally known Ziegler-Natta catalysts. That is, propylene and ethylene are supplied in a polymerization vessel at a polymerization temperature of −50 to 150° C., preferably −10 to 100° C., and a polymerization pressure of an atmospheric pressure to 7 MPa, preferably 0.2 to 5 MPa, and copolymerized for 1 minute to 20 hours.

During copolymerization, a proper amount of hydrogen can be added for control of molecular weight similarly to the conventional copolymerization processes.

After copolymerization of propylene and ethylene, propylene-ethylene copolymers to be used in fibers of the invention are obtained, if necessary, by known after-treatment procedures such as a catalyst deactivation procedure, a catalyst residue removing procedure and a drying procedure.

In the preparation method of propylene-ethylene copolymers used in fibers of the invention by copolymerizing ethylene and propylene in the presence of the above-mentioned catalyst of combined metallocene and aluminoxane, reverse insertion is scarcely formed owing to controlled 1,2-insertion in an insertion reaction of propylene, and on the other hand, ethylene units bond more randomly in the copolymer owing to controlled continuous insertion reaction in an insertion reaction of ethylene.

As the result, in the preparation method of propylene-ethylene copolymers, propylene-ethylene copolymer can be obtained having monomer chains with more randomly bonded ethylene units, an extremely low reverse insertion amount of propylene monomer units and a narrow molecular distribution.

In propylene-ethylene copolymers used as a raw material for fibers of the invention, various additives such as an antioxidant, an ultraviolet absorbing agent, an antistatic agent, a nucleating agent, a lubricant, a flame retardant, an antiblocking agent, a colorant, an inorganic or organic fillers, as well as various synthetic resins may be blended if necessary, in powdery form or using a melt-blending machine, at 190 to 350° C. for 20 seconds to 30 minutes, and then supplied as propylene-ethylene copolymer in a pellet form cut into particles.

Furthermore, the specified propylene-ethylene copolymer according to the invention may be mixed with other propylene-ethylene copolymers having a different molecular weight distribution or other copolymers having a similar molecular weight distribution but a different weight average molecular weight, to carry out processing of fibers. Furthermore, other thermoplastic resins may be mixed in in order to carry out processing of fibers without losing efficiency of the invention.

As processing methods of fibers used in the invention, various known spinning methods such as a melt-spinning method, a spun-bonding method and a melt-blowing method are exemplified. By these processing methods, fibers can be converted into multifilaments, monofilaments, staple fibers, tows, webs, non-woven fabrics and knitted fabrics.

Furthermore, a fineness of fibers is not limited particularly and may be any appropriate fineness according to physical properties of used propylene-ethylene copolymer and applications of fibers. For example, in the case of use as hygiene materials represented by absorbent articles such as surface materials of paper diapers and sanitary napkins, surgical cloths and surgical sheets etc., it is preferably 0.1 to 10 D. In the case of use as needle punch carpets and tufted carpets etc., it is preferably 8 D to 80 D. In the case of use as materials of engineering works such as monofilaments, it is preferably 50 D to 7000 D. Furthermore, in the case of use as filters for fine filtration, extremely fine fibers of about 0.1 to 15 μm are preferable.

Fibers of the invention may be subject to crimping if necessary.

Webs can be prepared as fibrous webs such as random webs, parallel webs or cross wrap webs etc. by a card or random webber in the case that fibers of the invention are short fibers of more than 20 mm or as fibrous web by an airlay method or a paper-making method in the case of short fibers having a length of less than 20 mm.

A fibrous length is preferably 30 to 150 mm in order to orient fibers in a flow direction of a non-woven fabric in the case that fibers are passed through a card or random webber, more preferably 50 to 130 mm, when considering the card passage properties.

The obtained web can be converted into a non-woven fabric by any known processing method for non-woven fabric such as a needle punch method, a thermal roll processing method, a hot-air dryer method, an ultrasonic adhesive method and a high-pressure water flow (water jet) method, and also multiple these processing methods for non-woven fabrics can be combined.

Fibers of the invention can be used as a continuous fibrous web obtained by a spun-bonding method or a melt-blowing method etc. The continuous fibrous web can be converted into a non-woven fabric by using the above-mentioned processing methods for non-woven fabrics.

A basis weight of the non-woven fabric consisting of fibers according to the invention is selected according to the application objects. In the case of using as surface materials of absorbent articles, it is preferably within a range of 5 to 50 g/m$^2$. In the case of using these materials in engineering works such as drain materials, it is preferably within a range of 50 to 2000 g/m$^2$. Synthetic fibers such as polyesters etc., natural fibers such as wool etc., and regenerated fibers such as rayon etc. may be mixed into if necessary within a range not interfering the efficiency of the invention.

Furthermore, fibers of the invention can be converted, as such or with other fibers, into primary fibrous products such as knitted woven products and fibrous moldings, by fiber-mixing, mix-spinning, mix-weaving, cross-knitting and cross-weaving.

The invention covers fibers spun as single fibers from component consisting of only propylene-ethylene copolymer specified in the invention, as well as covers fibers spun as mono-component fibers from component consisting of the propylene-ethylene copolymer and other synthetic resins and additives.

The invention covers not only mono-component fibers but also fibers obtained by spinning as mono-component fibers from a component consisting only of propylene-ethylene copolymer specified in the invention, as well as covers fibers obtained by spinning as mono-component fibers from a component consisting of the propylene-ethylene copolymer specified in the invention or a composition containing it and an other component consisting of synthetic resins by such a way that having cross-section arrangement of a parallel type, a sheath-core type, an eccentric sheath-core type, and a hollow type (called as "composite fiber" or "bi-component fiber"). In this case, as synthetic resins forming the other component, thermoplastic resins are preferable. As thermoplastic resins used as the other component, polyolefin resins, polyester resins and polyamide resins are mentioned, and specifically polypropylene, high-density polyethylene, linear low-density polyethylene, ethylene/propylene copolymer, ethylene/1-buten/propylene terpolymer, polyethylene terephthalate, polybutylene terephthalate, low-melting polyesters obtained by copolymerization of diol and terephthalic acid/isophthalic acid, nylon 6 and nylon 66 etc. are exemplified.

In composite fibers according to the invention, particularly in the case of composite fibers of a sheath-core type or a deviated sheath-core type, it is preferable to spin them in such a way that a low-melting component becomes a sheath component. The reason for this is that a low-melting component of a sheath side is molten by heat to form an adhesive part, in the case of preparation of non-woven fabric by thermal adhesion with using fibers of the invention. Since propylene-ethylene copolymer specified in the invention has a relatively low melting point, composite fibers of a sheath-core type or a deviated sheath-core type spun which have the components containing the copolymer as a sheath and a thermoplastic resin having a higher melting point than that of the component as a core are preferable embodiments of the invention, and they have an efficiency of the invention sufficiently. A composite ratio of composite fibers may be optionally selected.

Fibers of the invention have a particularly large effect, either of mono-component fibers or composite fibers, if the propylene-ethylene copolymer is contained in propylene-ethylene copolymer specified in the invention in an amount of more than 30% by weight, more preferably more than 50% by weight. In the case of not containing other thermoplastic resin as a component, the effect of the invention using propylene-ethylene copolymer specified in the invention is obtained maximally.

Fibers of the invention can be processed secondarily and used widely in a clothing field such as underwear, shirts, blouses, socks, Japanese socks and pantyhose etc.; a bed clothes field such as inside materials, outside materials, sheets, bedcovers, pillow covers and cushions etc.; a medical field such as surgical masks, surgical gowns, caps, doctor's gowns, gauze and bandages; hygiene materials such as sanitary products, throwaway diapers and urine pads etc.; an interior field such as wallpapers; a field such as inner materials of shoes, intermediate layer and shoes materials; agricultural and gardening materials such as fruit protecting materials and food protecting materials; living articles such as confection wrapping materials, food wrapping materials, cloth wrapping, towels, wet cloths, brushes, table cloths, aprons, kitchen cloths, kitchen gloves, cosmetic puffs, tea bags and wiping cloths; materials of engineering works such as concrete reinforcing materials and draining materials; as well as a filtration material field such as air filters, tobacco filters and liquid filters etc.

EXAMPLES

The invention is now illustrated by way of Examples. However, it will be understood that the invention is not limited to these following Examples. Definitions of words and determination methods used in Examples and Comparative Examples are as follows:

(1) Total content of ethylene units: (unit, mol %) determined by $^{13}$C-NMR spectrum.

(2) Triad proportion (PEP):
a proportion of such chains that three-monomer chain unit (triad) in main chains of copolymer are "propylene unit→ethylene unit→propylene unit" determined by $^{13}$C-NMR spectrum.

(3) Triad proportion (EEP):
a proportion of such chains that three-monomer chain unit (triad) in main chains of copolymer are "ethylene unit→ethylene unit→ethylene unit" determined by $^{13}$C-NMR spectrum.

(4) Ratio (Nαβ) of a total α,β-methylene carbon atom number to a total propylene unit content (C3): (unit, mol %) determined by $^{13}$C-NMR spectrum.

(5) Weight average molecular weight (Mw): determined by GPC.

(6) Number average molecular weight (Mw): determined by GPC.

(7) Melting point (Tm): (unit: ° C.) determined by DSC.

(8) Initial tensile resistance: (unit, gf/D)
Longitudinal (MD direction) tensile strength was determined according to JIS L 1015 (1981). However, a portion of the fibers was also determined at 80° C. A higher initial tensile resistance shows a higher rigidity.

(9) Average fibrous diameter: (unit, $\mu$).

Five test samples were took from a web and/or a non-woven fabric after spinning, and photographed by an electronic microscope. One hundred fibrous diameters were determined from the photography and an average value of them was defined as an average fibrous diameter.

(10) Strength of non-woven fabric at 5% stretched: (unit, kgf/5 cm width).

A non-woven fabric having a width of 5 cm was tested using a tensile strength tester equipped with a temperature controller under such conditions as a clamping distance of 10 cm and a tensile speed of 100 mm/minute, and then converting into a basis weight of the non-woven fabric at 5% stretch, to obtain a strength. A strength of the non-woven fabric was determined in the longitudinal direction (MD direction). The strength was determined at a determination temperature of 20° C. and 80° C.

Calculation of strength K into basis weight 20 g/m$^2$ was carried out by the following formula:

$$K=(20/M)\times Y,$$

wherein M is a basis weight of a non-woven fabric and Y is a strength at 5% stretch.

(11) Strength of non-woven fabric: (unit, kgf/5 cm width)

A non-woven fabric having a width of 5 cm was tested by a tensile strength tester equipped with a temperature controller under such conditions as a clamping distance of 10 cm and a tensile speed of 100 mm/minute, to obtain a break strength after calculation into a value at a basis weight of the non-woven fabric of 20 g/m$^2$. A strength of the non-woven fabric was determined in a longitudinal direction (MD direction). The determination temperature was at room temperature.

Calculation of a strength K into a value at a basis weight 20 g/m$^2$ was obtained by the following formula:

$$K=(20/M)\times Y,$$

wherein M is a basis weight of a non-woven fabric and Y is a strength at break.

(12) Filtration accuracy: (unit, μm).

One cylindrical filter (250 mm) was mounted on a housing of a circulating type filtration tester, and water was recycled from a water tank of 50 dm$^3$ via a pump. After controlling a flow amount to 30 dm$^3$ per minute, AC fine test dusts (ACFTD) (mean diameter, 6.6 to 8.6 μm) were added as test powders to a water tank at 0.5 g/minute. After 5 minutes, the original solution and the solution after filtration were sampled. A particulate size distribution of particles contained in respective solutions was determined by using a light cut-off particulate detector. A collecting efficiency showing a ratio of particles collected by the filter was calculated using the determined result of the particulate size distribution, and a particulate diameter which collected 99.9% was defined as a filtration accuracy.

(13) Pressure resistant strength: (unit, kgf/cm$^2$)

In the above-mentioned filtration accuracy test, one cylindrical filter (250 mm) was mounted on a housing of a circulating type filtration tester, AC fine test dusts (ACFTD) (mean diameter, 6.6 to 8.6 μm) were added as test powders to a water tank at 0.5 g/minute and pressure difference between an inlet side and an outlet side of housing was determined. Addition of powders was continued until the pressure difference of the filter reached to 10(kgf/cm$^2$) or filter was deformed, and the pressure difference at that time was defined as a pressure resistant strength.

(14) Heat resistance:

A cylindrical filter was immersed in warm water having a temperature of 90° C. and treated for two hours. Thereafter, a size of the cylindrical filter was determined. Also, change of appearance etc. was observed. Heat resistance was tested on the following basis:
change of size is within 3 mm: ○
change of size is over 3 mm or strain is recognized in appearance: x

(15) Softness:

A non-woven fabric having a basis weight of 20 g/m$^2$ was evaluated as to touch based on the following three ranks:
soft: ○
normal: Δ
rigid: x
by touch feelings of 10 panelists, and an average value of the evaluated results by 10 panelists was used as an index of softness.

Preparation method of propylene-ethylene copolymer used in the present invention is illustrated as follows.

Polymerization 1

After the interior of a polymerization vessel having an inside volume of 100 dm$^3$ made of stainless steel equipped with a stirrer, was filled with nitrogen gas, 50 dm$^3$ of n-hexane, a solution of 2.0 mol (calculated as Al atom) of methyl aluminoxane in toluene (made by Toso-Akzo Co. Ltd., trade name: MMAO, concentration: 2 mol/dm$^3$), as well as a mixture of 0.09 mmol of dimethyl silylene (2,3, 5-tromethyl cyclopentadienyl)(2',4',5'-trimethyl cyclopentadienyl) hafnium dichloride as a chiral metallocene and 0.01 mmol of a meso compound, dimethyl silylene (2,3,5-trimethyl cyclopentadienyl)(2',3',5'-trimethyl cyclopentadienyl) hafnium dichloride, were introduced with 0.5 dm$^3$ of toluene at 20° C.

Then, after a temperature within the polymerization vessel was raised to 45° C., a mixed gas of 93.9 mol % of propylene, 6.0 mol % of ethylene and 0.1 mol % of hydrogen was supplied continuously into the polymerization vessel while one part of the mixed gas present in a gaseous phase part of the polymerization vessel was exhausted in order to keep a temperature of 45° C. and a pressure of 0.4 MPa, to carry out copolymerization of propylene and ethylene for 4 hours.

After polymerization was ended, non-reacted propylene, ethylene and hydrogen were discharged from the polymerization vessel, thereafter 3 dm$^3$ of 2-propanol was introduced in the polymerization vessel and stirred at 30° C. for 10 minutes, to deactivate the catalyst. Subsequently, 0.2 dm$^3$ of aqueous hydrogen chloride solution (concentration: 12 mol/dm$^3$) and 8 dm$^3$ of methanol were added and heated at 60° C. for 30 minutes. After the treatment, the stirring was stopped and an aqueous phase part was removed from a lower part of the polymerization vessel, then similar operations were repeated by using the same amounts of an aqueous hydrogen chloride solution and methanol. Then, 0.02 dm$^3$ of an aqueous sodium hydride solution (concentration: 5 mo/dm$^3$), 2 dm$^3$ of water and 2 dm$^3$ of methanol were added, and stirred at 30° C. for 10 minutes. After the treatment, stirring was stopped and an aqueous phase portion was removed from a lower part of the polymerization vessel, then an additional 8 dm$^3$ of water was added and stirred at 30° C. for 10 minutes. After repeating the removal of the aqueous phase portion twice, the polymer slurry was taken from the polymerization vessel, filtered and dried, to obtain 2.4 kg of propylene-ethylene copolymer, which was used as a sample for evaluation.

Polymerization 2

Propylene-ethylene copolymer was prepared to obtain a sample for evaluation under the same conditions as in Polymerization 1, except that the composition of the mixed gas supplied in a polymerization vessel was 96.8 mol % of propylene, 3.2 mol % of ethylene and 0 mol % of hydrogen and that a polymerization temperature was 50° C.

Polymerization 3

Propylene-ethylene copolymer was prepared to obtain a sample for evaluation under the same conditions as in Polymerization 1, except that n-hexane used in Polymerization 1 as a polymerization solvent was substituted with 50 d$^{m3}$ of toluene and that a composition of a mixed gas supplied in a polymerization vessel was 84.8 mol % of propylene, 15.1 mol % of ethylene and 0.1 mol % of hydrogen.

Polymerization 4

Copolymerization of propylene-ethylene and purification were carried out under the same conditions as in Polymerization 3, except that a mixture of 0.09 mmol of dimethyl silylene (2,3,5-trimethyl cyclopentadienyl)(2',4',5'-trimethyl cycopentadienyl) zirconium dichloride as a chiral metallocene and 0.01 mmol of a meso compound, dimethyl silylene (2,3,5-trimethyl cyclopentadienyl)(2',3',5'-trimethyl cyclopentadienyl) zirconium dichloride was used, and that a composition of a mixed gas supplied in a polymerization vessel was 91.1 mol % of propylene, 8.8 mol % of ethylene and 0.1 mol % of hydrogen, and thereafter the solvent part containing copolymer was removed from the polymerization vessel.

Since the total amount of copolymer was dissolved in the removed solvent, the solution was introduced in a solvent removing device under a reduced pressure, removed off 95% of toluene at 70° C. under a reduced pressure, cooled to 25°

C., precipitated by introducing 20 dm³ of methanol, filtered and dried, to prepare propylene-ethylene copolymer, from which a sample for evaluation was obtained.

Polymerization 5

Propylene-ethylene copolymer was prepared to obtain a sample for evaluation under the same conditions as in Polymerization 1 except that a combination catalyst comprising 0.28 mmol as Ti calculation of a titanium catalyst component supported on magnesium chloride, 80 mmol of triethyl aluminium and 8 mmol of diisopropyl dimethoxy silane as the third component was used instead of the catalyst (metallocene and methyl aluminoxanae) used in Polymerization 1, that 0.5 mol of hydrogen was introduced into the polymerization vessel before a mixed gas of propylene and ethylene was supplied in the polymerization vessel, that a mixed gas having a composition of 93.4 mol % of propylene and 6.6 mol % of ethylene was subsequently supplied in the polymerization for 2 hours at such a supplying speed that a polymerization pressure was maintained at 0.69 MPa without any discharge of unreacted mixed gas from the polymerization vessel, and that a polymerization temperature was 60° C.

Polymerization 6

Copolymerization of propylene-ethylene and purification were carried out under the same conditions as in Polymerization 1 except that a mixture of 0.09 mmol of rac-ethylene bis(indenyl)hafnium dichloride as a chiral metallocene and 0.01 mmol of a meso compound, meso-ethylene bis(indenyl) hafnium dichloride. When the solvent part containing copolymer was removed from the polymerization vessel, the total amount of copolymer was dissolved in the removed solvent. Then, distilling off the solvent under a reduced pressure, preparation of copolymer by introducing methanol, filtration and drying were carried out similar to Polymerization 4, to obtain propylene-ethylene copolymer, which was used as sample for evaluation.

Example 1

Preparation of fibers and processing thereof into a non-woven fabric were carried out according to the following methods by using the propylene-ethylene copolymer of Polymerization 1, and then physical properties of the obtained fibers were determined and evaluated.

Fibers were produced by using a spinning device equipped with an extruder, a spinneret having a hole diameter of 0.6 mm and a winding unit as well as a stretching device equipped multiple heating rolls and a stuffer box type crimper. A non-woven fabric thermally adhered at a relatively low temperature and a non-woven fabric thermally adhered at a relatively high temperature were produced.

Spinning was carried out at a spinning temperature of 280° C. and a spinning speed of 964 m/minute of the extruder, to obtain non-stretched threads having a single fiber fineness of 3.2 D. These non-stretched threads were stretched under such conditions that a temperature of a stretching roll was 40° C. and a stretching ratio was 1.5, crimped at 14 peaks/25 mm by a crimper, and cut by means of a cutter, to obtain fibers having a single fiber fineness of 2.2 D and a fibrous length of 51 mm.

These fibers had a single fiber strength of 2.3 gf/D, a stretching rate of 311% and an initial tensile resistance of 20 gf/D. These fibers were carded by using a carding machine at a speed of 20 m/minute, to obtain a web having a basis weight 20 g/m². Subsequently, it was adhered thermally by using an embossing roll thermal adhering device with a projection part area of 24% at a temperature of 126° C., to obtain a non-woven fabric. A longitudinal strength of the non-woven fabric was 5.10 kgf/5 cm width. Similarly, the carded web was thermally adhered at a temperature of 134° C., to obtain a non-woven fabric. A longitudinal strength of the non-woven fabric was 6.92 kgf/5 cm width. Softness of the non-woven fabrics thermally adhered at 126 and 134° C. is good in both cases.

Therfrom, it can be seen that fibers in Example 1 have a relatively high initial tensile resistance and that the non-woven fabric with use of them has also a high strength after subjected to the high temperature treatment. Evaluated results are shown in Table 1.

Example 2

Processing into a non-woven fabric was carried out according to the following methods by using the propylene-ethylene copolymer of Polymerization 2, and then physical properties of the obtained spun bonded fibers were determined and evaluated.

A spun bonded continuous fibrous fabric was produced by using a spun-bonding device equipped with an extruder, a spinneret having a hole diameter of 0.4 mm, an air sucker type drawer, a net conveyor type web collecting unit, a heating machine and a non-woven fabric winding unit etc. As the heating machine, a device equipped with an embossing roll of a thermal adhering device with a projection part area of 11% was used.

A spinning temperature was 230° C. and a drawing speed of the air sucker type drawer was 4091 m/minute of the extruder. The obtained continuous fibrous web had a single fiber fineness of 1.1 D. And, the thermal adhering temperature of the continuous fibrous web was 134° C.

The non-woven fabric had a basis weight of 20 g/m² and a longitudinal strength of 6.55 kgf/5 cm width. Furthermore, the non-woven fabric had a longitudinal tensile strength at 5% stretching of 2.07 kgf/5 cm width at 25° C. and a longitudinal tensile strength at 5% stretching of 1.86 kgf/5 cm width at 80° C.

The non-woven fabric had a good tensile strength at 5% stretching at a high temperature. The fabric was superior in softness, and also markedly superior, to the fabric in Example 1. Furthermore, there was no fuming which lowers a thread stretching property.

Example 3

A fine fibrous non-woven fabric was produced by using a melt-blowing device equipped with an extruder, a melt-blowing spinneret having a hole diameter of 0.3 mm, a net conveyor type web collecting unit, a calendering device and a non-woven fabric winding unit etc.

Propylene-ethylene copolymer of Polymerization 4 was extruded at a spinning temperature in an extruder of 330° C., and the resin extruded from spinning holes was introduced into with hot air heated at 400° C. (pressure: 1.9 kgf/cm²) and blown onto a web collecting unit of a net conveyor, to obtain a fine fibrous web having a basis weight of about 20 g/m² by a melt-blowing method. Heating air, which was blown with the web was removed under suction by means of a high-speed air stream suction removing unit equipped at the lower part of the net conveyor. The web became a non-woven fabric which was molten and adhered by inherent heat during spinning. Physical properties of the non-woven fabric are shown in Table 2.

Example 4

Spinning of melt-blown fine fibers and molding of a cylindrical filter were carried out in continuous methods by using an extruder, a melt-blowing spinneret having a hole diameter of 0.3 mm, a net conveyor type web collecting unit, a through air type heating machine and a cylindrical filter molding machine of metal core winding type.

A filter molding machine equipped with an infrared ray type heating unit was used.

In order to carry out preparation, propylene-ethylene copolymer of Polymerization 4 was used. The resin was extruded at a spinning temperature in an extruder of 300° C., and the resin extruded from spinning holes was introduced into with hot air heated at 400° C. with varying pressure from 0.3 to 2.7 kgf/cm$^2$ and blown onto a web collecting unit of a net conveyor, to obtain a fine fibrous web having a basis weight of about 50 g/m$^2$ by a melt-blowing method. Heating air which was blown with the web was removed under suction by means of a high-speed air stream suction removing unit equipped at the lower part of the net conveyor. In order to carry out the melt-blowing spinning, pressure of heating air was changed subsequently in such a way that an inner layer for one filter part was low, a middle layer was high and an outer layer was low.

The web was a density inclining type web wherein fibrous diameter changes respectively from large in the inner layer, via small in the middle layer and to large in the outer layer. The web was heated at a temperature of 115° C. by a through-air type heating machine, wound around a metal core of a cylindrical filter molding machine continuously, cooled after a specified outer diameter was attained, and cut into a specified size, to obtain a cylindrical filter in which cross-points of fibers and non-woven fabric layers was melt adhered. Molding was carried out by heating at a temperature of 115° C. by means of an infrared heating device during molding. The cylindrical filter had an inner diameter of 30 mm, an outer diameter of 70 mm and a length of 250 mm.

Tested results such as a filtering accuracy of the obtained cylindrical filter are shown in Table 2.

Example 5

By the similar preparation method to the above-mentioned Example 3, a melt-blown fine fibrous non-woven fabric thermally adhered by pressure was prepared. However, a calendering thermal treatment was used instead of the through-air thermal treatment.

Propylene-ethylene copolymer of Polymerization 4 was extruded at a spinning temperature in an extruder of 305° C., and the resin extruded from spinning holes was converted into a melt-blown fine fibrous web having a basis weight of about 25 g/m$^2$ by introducing heated air at a temperature of 400° C. under a pressure of 1.6 kgf/cm$^2$, which web was then wound continuously on a winding device. The web became a non-woven fabric matter having weak thermal adhesion by inherent heat during spinning.

The non-woven fabric matter was treated at a temperature of 110° C. by using a calendering device, to obtain a thermally adhered non-woven fabric. The non-woven fabric had an average fibrous diameter of 0.4 µm as well as strength at 5% stretched of 0.85 kgf/5 cm width at a temperature of 25° C. and that of 0.75 kgf/5 cm width at a temperature of 80° C.

This non-woven fabric had a small fibrous diameter, was porous and also was thermally resistant etc., so that it was judged to be useful as a battery separator. Furthermore, this non-woven fabric was judged to be useful as a filter etc. as such or by any after-treatment such as winding or folding etc.

Example 6

A cylindrical filter was molded by using the non-woven fabric obtained in the above-mentioned Example 5. The above-mentioned non-woven fabric was wound around a hollow support made of porous and heat resistant resin to mold a cylindrical filter having an inner diameter of 30 mm, an outer diameter of 70 mm and a length of 250 mm. The non-woven fabric was fixed to the filter at terminal parts having a heat seal width of 4 mm.

The filter had a filtering accuracy of 0.6 µm, a pressure resistant strength of more than 10 and a good heat resistance.

As described above, the cylindrical filter according to the invention was a filter having a good filtering accuracy and a superior heat resistance. The cylindrical filter according to the invention was judged to be useful of course as a filter used at the normal temperature and a filter for filtering at a high temperature, or a filter for foods and medical products after heating and sterilizing treatments etc.

Example 7

A spun-bonded continuous fibrous non-woven fabric was prepared by using propylene-ethylene copolymer of Polymerization 2 by the similar preparation method to Example 2. The copolymer was melt extruded at a spinning temperature in an extruder of 230° C., and the resin extruded from spinning holes were stretched at a speed of 3214 m/minute to obtain fibers, which were blown with air onto a net conveyor. Air which was blown was suction removed by an exhausting device equipped on a lower part of a net conveyor. The obtained continuous fibrous web had a single fiber fineness of 1.4 D. The continuous fibrous web was thermally adhered by means of an emboss roll type thermal adhering device at 134° C., to obtain a continuous fibrous non-woven fabric in which fibers are thermally adhered to each other under pressure. The non-woven fabric had a basis weight of 20 g/m$^2$ and a longitudinal strength of 6.42 kgf/5 cm width. Furthermore, the non-woven fabric had a 5% longitudinal tensile strength of 2.03 kgf/5 cm width at 25° C. and a 5% longitudinal tensile strength of 1.79 kgf/5 cm width at 80° C.

The non-woven fabric had a good longitudinal tensile strength at 5% stretching at a high temperature.

Example 8

Thermally molten adhesive composite fibers were prepared by the similar preparation method to Example 1. However, as a composite spinning device, there was used a composite spinning device equipped with two extruders and sheath-core type composite spinnerets having a hole diameter of 0.6 mm. Sinning was carried out at a spinning temperature of 305° C. by using propylene-ethylene copolymer of Polymerization 1 as a sheath component and polyethylene terephthalate having a melting point of 255° C. as a core component. Non-stretched threads having a single fiber fineness of 3.2 D were obtained by spinning at a melt extruding speed of 924 m/minute and a ratio of a sheath component weight to a core component weight of 4:6 (a composite ratio), which threads were then stretched under such conditions as a stretching roll temperature of 95° C. and a stretching ratio of 1.5, crimped at 15 peaks/25 mm by a crimper and thereafter cut, to obtain short fibers having a single fiber fineness of 2.2 D and a fibrous length of 51 mm. The fibers had a single fiber strength of 3.0 gf/D, a stretching degree of 202% and an initial tensile resistance of 28 gf/D.

The short fibers were thermally adhered with pressure by means of a carding and emboss roll type thermal adhering device, to obtain two kinds of non-woven fabrics thermally adhered at different temperatures.

The non-woven fabric obtained at a thermal adhering temperature of 126° C. had a basis weight of 20 g/m$^2$ and a longitudinal strength of 5.55 kgf/5 cm width. And, the non-woven fabric obtained at a thermal adhering temperature of 134° C. had a basis weight of 20 g/m$^2$ and a longitudinal strength of 6.68 kgf/5 cm width.

The composite fibers became thermally adhesive by a thermal treatment at a temperature between higher than a softening point of the sheath component and lower than a melting point of the core component, as well as had a high single fiber strength and a high initial tensile resistance. Furthermore, the thermally adhered non-woven fabrics with use of the composite fabric were the strong fabrics concerning to both of treated at low and high temperatures. Furthermore, softness was also good. However, there was found fuming around spinnerets but slightly.

Example 9

The non-woven fabric obtained at a thermally adhering temperature of 126° C. in the above-mentioned Example 8 was used to prepare an absorbent article.

Adult paper diaper was used, and only a surface material of the paper diaper was substituted with the non-woven fabric from the above-mentioned Example 6. The paper diaper originally consisted of a surface material of polypropylene spun-bonded non-woven fabric having a basis weight of 21 g/m$^2$, an absorbing material in which pulp and highly absorbing resin are mixed, as well as a backing material of fine porous polyethylene film, wherein the absorbing material was wrapped with pulpy tissue as well as the above-mentioned surface material and backing material were made as heat-sealed constitutions against their surroundings.

The surface material was removed from the paper diaper, to which the non-woven fabric of the above-mentioned Example 8 was laminated. Furthermore, at both side positions near leg parts between the above-mentioned surface material and the backing material, each three polyurethane elastic threads were clamped and thermally adhered near surroundings of the above-mentioned surface material and backing material. The remainder of the surface material was cut by scissors and removed, to make a paper diaper with use of the non-woven fabric consisting of thermally adhering composite fibers. Since the paper diaper was curved in an approximately bow form due to polyurethane elastic threads arranged near both leg parts and also the surface material had a high strength, there could be made a superior product as an adult paper diaper. Since the surface material of the paper diaper was very flexible, it had a soft touch.

Example 10

Composite monofilaments were prepared by using a composite monofilament manufacturing device equipped with two extruders, sheath-core type composite spinnerets having a hoe diameter of 1.0 mm, a warm water bath and a stretching machine.

Propylene-ethylene copolymer of Polymerization 3 used as a sheath component and polyethylene terephthalate having a melting point of 34° C. used as a core component were spun into water of 34° C. at a spinning temperature of 300° C., to obtain non-stretched composite monofilaments having a single fiber fineness of 1750 D. The non-stretched threads were spun and stretched continuously under such conditions as the first and the second stretching temperatures of 105° C., a warm water bath temperature of 96° C. and a stretching ratio of 7.0, to prepare composite monofilaments. The obtained composite monofilaments had a ratio of a sheath component weight to a core component weight of 4:6, a single fiber fineness of 251 D, a monofilament strength of 6.9 gf/D, a stretching rate of 35% and an initial tensile resistance of 45 gf/D. Furthermore, the fibers had an initial tensile resistance of 37 gf/D at 80° C.

The composite monofilaments had a thermal adhesability, a high strength and a high initial tensile resistance, particularly a high initial tensile resistance at a high temperature.

Example 11

A net in which cross-points of fibers are thermally adhered was prepared as follows by using a net manufacturing device equipped with a weaving machine and a hot through air type heater.

A net having a weaving density of 9 warps/50 mm and 9 wefts/50 mm was woven by using composite monofilaments of the above-mentioned Example 10 as warps and wefts and heated at a temperature condition of 155° C., to prepare a net in which cross-points of fibers are thermally adhered. Thermal treatments for weaving and thermal adhesion of the net were carried out continuously.

A strength in a longitudinal direction of the obtained net was 8.57 kgf/5 cm width.

The net was judged to be preferably useful as an agricultural housing cover material, a protective nets for engineering work and an intermediate material such as filter when used alone or together with other products such as other non-woven fabrics and moldings of synthetic resins.

Comparative Example 1

Propylene-ethylene copolymer of Polymerization 5 was processed into fibers and physical properties of the obtained fibers were determined and evaluated by a similar method to Example 1. As the result, fibers having a single fiber fineness of 2.2 D were obtained. The fibers had a single fiber strength of 1.2 gf/D, a stretching rate of 314% and an initial tensile resistance of 9 gf/D. The fibers were subject to carding and thermal adhesive treatments, to obtain a non-woven fabric having a basis weight of 20 g/m$^2$. The non-woven fabric obtained at a thermal adhesion temperature of 126° C. had a longitudinal strength of 4.00 kgf/5 cm width and one obtained at a thermal adhesion temperature of 134° C. had a longitudinal strength of 3.91 kgf/5 cm width. Softness of the non-woven fabric was normal at a thermal adhesion temperature of 126° C., but became hard at 134° C. Furthermore, fuming could be confirmed near spinnerets.

Therefore, it was seen that the fibers of Comparative Example 1 had a relatively low initial tensile resistance and that the non-woven fabric with use of the fibers had a decreased strength in the case of a high temperature treatment was carried out. Evaluated results are shown in Table 1.

Comparative Example 2

Propylene-ethylene copolymer of Polymerization 6 was processed into fibers and a non-woven fabric, and then physical properties were determined and evaluated by a similar method to Example 1.

As the result, fibers having a single fiber fineness of 2.2 D were obtained. The fibers had a single fiber strength of 1.0 gf/D, a stretching rate of 351% and an initial tensile resistance of 8 gf/D. The fibers were subject to carding and thermal adhesive treatments, to obtain a non-woven fabric having a basis weight of 20 g/m². The non-woven fabric obtained at a thermal adhesion temperature of 126° C. had a longitudinal strength of 4.10 kgf/5 cm width and one obtained at a thermal adhesion temperature of 134 ° C. had a longitudinal strength of 3.63 kgf/5 cm width. Softness of the non-woven fabric was normal at a thermal adhesion temperature of 126° C., but became hard at 134° C. Furthermore, fuming could be confirmed.

Therefore, it was seen that the fibers had a relatively low initial tensile resistance and that the non-woven fabric with use of the fibers had a decreased strength in the case of a high temperature treatment is carried out. Evaluated results are shown in Table 1.

Comparative Example 3

A fine fibrous non-woven fabric was prepared by a similar method to Example 3.

Propylene-ethylene copolymer of Polymerization 5 was extruded at a spinning temperature in an extruder of 310° C., and the extruded resin from spinning holes were blown on a web collecting device of a net conveyor by introducing heating air having a temperature of 400° C. (pressure: 1.9 kgf/cm²), to make a fine fibrous web by a melt-blowing method having a basis weight of about 25 g/m². The heating air which was blown with the wab was suction removed by a high-speed air stream suction removing device equipped on a lower part of a net conveyor. The web became a non-woven fabric by inherent heat during spinning. Physical properties of the non-woven fabric are shown in Table 2.

Comparative Example 4

Spinning and molding into a cylindrical filter were carried out by using propylene-ethylene copolymer by the similar method to Example 4. The tested results such as an accuracy of the obtained cylindrical filter are shown in Table 2.

Comparative Example 5

A spun-bonded continuous fibrous non-woven fabric was prepared by a similar preparation method to Example 2 by using propylene-ethylene copolymer of Polymerization 5.

A spinning temperature was 230° C. and a drawing speed by an air sucker type drawer was 1607 m/minute. The obtained continuous fibrous web had a single fiber fineness of 2.8 D. Furthermore, a thermal adhering temperature of the continuous fibrous web was 134° C.

The non-woven fabric had a basis weight of 21 g/m² and a longitudinal strength of 4.80 kgf/5 cm width. Furthermore, the non-woven fabric had a longitudinal tensile strength at 5% stretched at 25° C. of 1.49 kgf/5 cm width and a longitudinal tensile strength at 5% stretched at 80° C. of 1.34 kgf/5 cm width. The non-woven fabric had an inferior longitudinal tensile strength at 5% stretched at low and high temperatures compared to the above-mentioned Example 7. Particularly, decrease of the tensile strength at 5% stretched at a high temperature was much.

Comparative Example 6

On the other hand, a paper diaper was prepared by a similar method to Example 9, by using the non-woven fabric prepared in Comparative Example 5 as a surface material. However, its touch was stiff since the non-woven fabric became partly film-like.

Comparative Example 7

Sheath-core type composite monofilaments were prepared by a similar method to the above-mentioned Example 10 by using propylene-ethylene copolymer and polyethylene terephthalate used in Example 10. Also, a spinning temperature, a composite ratio and stretching conditions were same as Example 10.

The composite monofilaments had a single fiber fineness of 252 D, a single fiber strength of 4.0 gf/D and a stretching rate of 52%. Furthermore, they had an initial tensile resistance of 29 gf/D at 20° C. and an initial tensile resistance of 20 gf/D at 80° C.

The composite monofilaments had a low strength and an initial tensile resistance both at the normal temperature and a high temperature.

Comparative Example 8

A net was prepared from the composite monofilaments of Comparative Example 7 by a similar method to Example 11.

A longitudinal strength of the obtained net was 5.05 kgf/5 cm width.

The net of this Comparative Example was judged to be unsuitable for use as a material of engineering work in which a high strength is required and an agricultural housing cover which is repeatedly used for applying and removing of net etc., since the net of this Comparative Example had a low strength.

As seen from Table 2, the cylindrical filter consisting of the melt-blown fine non-woven fabric had a finer fibrous diameter than that of the Comparative Example 4 spun under the same spinning conditions. Additionally, the cylindrical filter according to the invention was a filter having a good filtering accuracy and a superior heat resistance. The cylindrical filter according to the invention was judged to be useful as a filter not only for filtering use at the normal temperature but also at a high temperature as well as a filter for food and medical uses after thermal and sterilization treatments etc.

On the other hand, the cylindrical filter of the Comparative Example 4 had a high fibrous diameter as well as a poor filtering accuracy and a poor heat resistance. The filter was judged to be unusable as a filter for food and medical uses after thermal and sterilization treatments etc., since the filter had a poor heat resistance.

Example 12

After an inside of a polymerization vessel having an inside volume of 100 dm³ made of stainless steel equipped with a stirrer was substituted with nitrogen gas, a mixture of 50 dm³ of n-hexane, a solution of 7.6 mol (calculated as Al atom) of methyl aluminoxane in toluene (made by Tosoakzo Co. Ltd., trade name: MMAO, concentration: 2 mol/dm³), 1.48 mmol of dimethyl silylene (2,3,5-tromethyl cyclopentadienyl)(2',4',5'-trimethyl cyclopentadienyl) hafnium dichloride as a chiral metallocene and 0.05 mmol of a meso compound, dimethyl silylene (2,3,5-trimethyl cyclopentadienyl)(2',3',5'-trimethyl cyclopentadienyl) hafnium dichloride was introduced with 1 dm³ of toluene at 20° C. Then, a temperature within the polymerization vessel was raised to 27° C. and hydrogen was supplied in order to make a hydrogen partial pressure within the polymerization vessel of 0.04 MPa, thereafter propylene was supplied continuously for 4 hours in such an amount to keep the pressure within the polymerization vessel at 0.4 MPa, to polymerize propylene. A temperature within the polymerization vessel was kept 27° C. during polymerization. After polymerization was ended, non-reacted propylene was discharged from the inside of the polymerization vessel, thereafter 3 dm³ of 2-propanol was introduced in the polymerization vessel and stirred at 30° C. for 10 minutes, to deactivate the catalyst. Subsequently, 0.2 dm³ of an aqueous hydrogen chloride solution (concentration: 12 mol/dm³) and 8 dm³ of methanol were added and heated at 60° C. for 30 minutes. After the treatment, stirring was stopped and an aqueous phase part was removed from a lower part of the polymerization vessel, then similar operations were repeated by using the same amounts of an aqueous hydrogen chloride solution and methanol. Then, 0.02 dm³ of an aqueous sodium hydride solution (concentration: 5 mo/dm³), 3 dm³ of water and 2 dm³ of methanol were added, and stirred at 30° C. for 10 minutes. After the treatment, stirring was stopped and an aqueous phase part was removed from a lower part of the polymerization vessel, then 8 dm³ of water was added and stirred at 30° C. for 10 minutes. After repeating the operation for removing an aqueous phase part twice, polymer slurry was took from the polymerization vessel, filtered and dried, to obtain polypropylene.

Short fibers having a single fiber fineness of 2.2 D and a fibrous length of 51 mm were produced using polypropylene thus obtained as a core part and propylene-ethylene copolymer of Polymerization 1 as a sheath component of composite fibers by a similar method to Example 8, except for a spinning temperature of 280° C. and a stretching roll temperature of 80° C. The fibers exhibited a single fiber strength of 3.5 gf/D, a stretching rate of 252% and an initial tensile resistance of 30 gf/D.

The short fibers were subject to thermal adhering treatment etc. by means of a carding and emboss roll type thermal adhering device similar to the above-mentioned Example 1, to obtain two thermally adhered non-woven fabrics at different thermal adhering temperatures.

The non-woven fabric made at a thermal adhering temperature of 126° C. had a basis weight of 20 g/m² and a longitudinal strength of 5.62 kgf/5 cm width. The non-woven fabric made at a thermal adhering temperature of 134° C. had a basis weight of 20 g/m² and a longitudinal strength of 7.12 kgf/5 cm width.

The composite fibers had a thermal adhering property by thermal treatment at a temperature between above a softening point of the sheath component and below a melting point of the core component, as well as had a high single fiber strength and a high initial tensile resistance. Furthermore, the thermally adhered non-woven fabric with use of the composite fibers was a non-woven fabric having a high strength and an extremely good softness, in both cases of treated at a low temperature and a high temperature.

The evaluated results are shown in Tables 1–4.

TABLE 1

| Example and Comparative Example | | | Example 1 | Example 8 | Example 10 | Example 12 | Comparative Example 1 | Comparative Example 2 | Comparative Example 7 |
|---|---|---|---|---|---|---|---|---|---|
| Polymerization Number | | | 1 | 1 | 3 | 1 | 5 | 6 | 6 |
| evaluation results | physical properties of fibers | Fineness (D) | 2.2 | 2.2 | 251 | 2.2 | 2.2 | 2.2 | 252 |
| | | single filament strength (gf/D) | 2.3 | 3.0 | 6.9 | 3.5 | 1.2 | 1.0 | 4.0 |
| | | initial tensile strength (gf/D) | 20 | 28 | 45 | 30 | 9 | 8 | 29 |
| | | initial tensile strength (gf/D: 80° C.) | | | | 37 | | | 20 |
| | physical properties of nonwoven fabric | strength (kgf/5 cm width) (processing temperature: 126° C.) | 5.10 | 5.55 | | 5.62 | 4.00 | 4.10 | |
| | | strength (kgf/5 cm width) (processing temperature: 134° C.) | 6.92 | 6.68 | | 7.12 | 3.91 | 3.63 | |
| | | softness (processing temperature: 126° C.) | ◯ | ◯ | | ◯ | Δ | Δ | |
| | | softness (processing temperature: 134° C.) | ◯ | ◯ | | ◯ | x | x | |
| | | Fuming | No | slightly | slightly | No | Yes | Yes | Yes |

TABLE 2

| Example and Comparative Example | | | Example 3 | Example 4 | Example 5 | Example 6 | Comparative Example 3 | Comparative Example 4 |
|---|---|---|---|---|---|---|---|---|
| Polymerization Number | | | 4 | 4 | 4 | 4 | 5 | 5 |
| evaluation results | physical properties of nonwoven | fibrous diamter (μm) | 1.5 | | 0.4 | 0.6 | 1.48 | |
| | | strength (kgf/5 cm width) (5% stretching: 25° C.) | 1.42 | | 0.85 | | 1.29 | |
| | | strength (kgf/5 cm width) (5% stretching: 80° C.) | 1.48 | | 0.75 | | 0.90 | |

TABLE 2-continued

| Example and Comparative Example Polymerization Number | | | Example 3 4 | Example 4 4 | Example 5 4 | Example 6 4 | Comparative Example 3 5 | Comparative Example 4 5 |
|---|---|---|---|---|---|---|---|---|
| physical properties of nonwoven fabric | fibrous diameter of inner layer ($\mu$m) | | | 7.6 | | 0.4 | | 15.8 |
| | fibrous diameter of intermediate layer ($\mu$m) | | | 0.8 | | 0.4 | | 5.0 |
| | fibrous diameter of outer layer ($\mu$m) | | | 8.6 | | 0.4 | | 15.9 |
| | filtering accuracy | | | 1 | | 0.6 | | 8 |
| | pressure resistant strength (kgf/cm$^2$) | | than10 | 10 or more than 10 | than10 | 10 or more | | 10 or more |
| | heat resistance | | ○ | ○ | ○ | ○ | x | x |

TABLE 3

| Example and Comparative Example Polymerization Number | | | Example 2 2 | Example 7 2 | Comparative Example 6 4 |
|---|---|---|---|---|---|
| evaluation results | physical properties of fibers | Fineness (D) | 1.1 | 1.4 | 2.8 |
| | physical properties of nonwoven fabric | strength (kgf/5 cm width) (5% stretching: 25° C.) | 2.07 | 2.03 | 1.49 |
| | | strength (kgf/5 cm width) (5% stretching: 80° C.) | 1.86 | 1.79 | 1.34 |
| | | strength (kgf/5 cm width) (processing temperature: 134° C.) | 6.55 | 6.42 | 4.8 |

TABLE 4

| Polymerization example | unit | Polymerization 1 | Polymerization 2 | Polymerization 3 | Polymerization 4 | Polymerization 5 | Polymerization 6 |
|---|---|---|---|---|---|---|---|
| total ethylene content | mol % | 3.32 | 2.05 | 7.14 | 14.3 | 6.50 | 4.88 |
| triadd fraction (PEP) | PEP × 10$^2$ | 2.78 | 1.66 | 5.70 | 10.44 | 4.60 | 4.00 |
| triadd fraction (EEE) | EEE × 10$^2$ | 0.00 | 0.00 | 0.12 | 0.34 | 0.40 | 0.06 |
| α,β-methylene carbon atom ratio (Nαβ) | mol % | 0.07 | 0.07 | 0.08 | 0.20 | 0.01 | 1.41 |
| weight average molecular weight (Mw) | Mw × 10$^{-4}$ | 18.9 | 18.5 | 35.3 | 7.2 | 19.0 | 25.8 |
| molecular weight distribution (Mw/Mn) | — | 2.3 | 2.2 | 1.7 | 2.2 | 4.1 | 2.0 |
| melting point (Tm) | ° C. | 139.7 | 150.0 | 116.1 | 115.3 | 139.5 | 109.5 |

Thus, in summary, the fibers according to the invention show superior heat resistance during adhering processes, particularly when used as fibrous moldings. The fibers according to the invention can be improved in heat resistance while maintaining other characteristics, by using a specified propylene-ethylene copolymer as a raw material, compared to the conventional fibers containing conventional propylene-ethylene copolymer in the same proportion. For example, applications may be developed as filters etc. for which the use of the conventional propylene-ethylene copolymer fibers are restricted because of the required heat resistance. Furthermore, since strength and softness of the non-woven fabrics are extremely good, they are suitable as surface materials of sanitary napkins and throwaway diapers and have possible wider applications than the conventional fabrics made of propylene-ethylene fibers.

What is claimed is:

1. Fibers comprising a propylene-ethylene copolymer consisting of 0.01 to 15 mol % of ethylene units and 99.99 to 85 mol % of propylene units as at least one component, wherein:

a) a chain constitution of the copolymer found by means of nuclear magnetic resonance spectrum has the following relationships:

a-1) in three monomers chain units (triad) in main chains of the copolymer, there is a relationship according to formula (I):

$$0.0070 \times C2 - 0.0020 \leq PEP \leq 0.0070 \times C2 + 0.0130 \quad (I)$$

between a fraction of propylene unit—ethylene unit—propylene unit chain (PEP) and a total content of ethylene unit (C2), when PEP is positive, and a-2) in three monomer chain units (triad) in main chains of the copolymer, there is a relationship of formula (II):

$$0 \leq EEE \leq 0.00033 \times C2 + 0.0010 \quad (II)$$

between a fraction of three continuous ethylene units chain (EEE) and a total content of ethylene unit (C2), as well as a-3) a ratio of total $\alpha,\beta$-methylene carbon atoms (N$\alpha\beta$) to total propylene units is within a range of 0 to 1.2 mol %, b) a weight average molecular weight (Mw) is 50,000 to 1,500,000, as well as c) a ratio (Mw/Mn) of a weight average molecular weight (Mw) to a number average molecular weight (Mn) is 1.2 to 3.8.

2. Fibers according to claim 1, wherein there is a relationship according to formula (III)

$$-8.1 \times C2 + 156.0 \leq Tm \leq -4.4 \times C2 + 165.0 \quad (III)$$

between a melting point of the copolymer (Tm) and a total content of ethylene units (C2).

3. Fibers according to claim 1, wherein fibers are composite fibers in which propylene-ethylene copolymer constitutes at least one component.

4. A non-woven fabric, wherein fibers according to claim 1, is used.

5. A non-woven fabric according to claim 4, wherein the non-woven fabric is a continuous fibrous non-woven fabric obtained by a spun-bonding method.

6. A non-woven fabric according to claim 4, wherein the non-woven fabric is a continuous fibrous non-woven fabric obtained by a melt-blowing method.

7. A knitted textile, wherein fibers according to claim 1, is used.

8. A filter, wherein fibers according to claim 1, is used.

9. A filter, wherein a non-woven fabric according claim 4, is used.

10. An absorbent article, wherein a non-woven fabric according to claim 4, is partly used.

* * * * *